United States Patent [19]

Gravel

[11] 4,411,379

[45] Oct. 25, 1983

[54] SOLDER FEEDING GUN AND ATTACHMENT

[76] Inventor: Real Gravel, 9026 de la Montagne St., Valcourt, Canada, J0E 2L0

[21] Appl. No.: 282,072

[22] Filed: Jul. 10, 1981

[30] Foreign Application Priority Data

Oct. 30, 1980 [CA] Canada .................................. 363573

[51] Int. Cl.³ .............................................. B23K 3/00
[52] U.S. Cl. .................................................... 228/52
[58] Field of Search ...................... 228/52, 53; 431/345

[56] References Cited

U.S. PATENT DOCUMENTS

| | | | |
|---|---|---|---|
| 1,171,232 | 2/1916 | Muller | 228/53 |
| 2,093,527 | 9/1937 | Petti | 228/53 X |
| 2,280,879 | 4/1942 | Anderson | 228/53 |
| 2,323,577 | 7/1943 | Stull | 228/52 |
| 2,833,904 | 5/1958 | Cunningham | 228/53 |
| 2,875,719 | 3/1959 | Smith | 228/52 |
| 3,198,415 | 8/1965 | Taylor | 228/53 X |
| 3,521,804 | 1/1968 | Jacobs | 228/52 |
| 3,531,038 | 9/1970 | Dezzani | 228/52 X |
| 3,966,109 | 6/1976 | Hogan | 228/52 |
| 4,199,096 | 4/1980 | Keefe et al. | 228/52 |

FOREIGN PATENT DOCUMENTS

| | | |
|---|---|---|
| 339157 | 2/1934 | Canada . |
| 460551 | 10/1949 | Canada . |
| 643000 | 6/1962 | Canada . |
| 638043 | 11/1936 | Fed. Rep. of Germany ........ 228/52 |

*Primary Examiner*—Nicholas P. Godici
*Assistant Examiner*—M. Jordan

[57] ABSTRACT

A device of the gun type adapted to carry a soldering torch and to feed a strip of solder adjacent the nozzle of the torch. This solder feeding gun is characterized by being adapted to carry such torch and to feed the strip of solder with only one hand, by allowing to feed either a bar or a wire of solder, and by allowing use of both the torch and the solder feeding gun separate from each other. This solder feeding gun comprises a body forming a hand grip portion, a holder portion for a soldering torch, a holder for a supply of coiled solder, and a piston chamber portion, with a piston and a finger actuated lever to feed the solder adjacent the nozzle of the soldering torch. An attachment is also particularly adapted to fit on the nozzle to enhance heating and melting of a strip of solder and to channel the flow of the melted solder.

3 Claims, 15 Drawing Figures

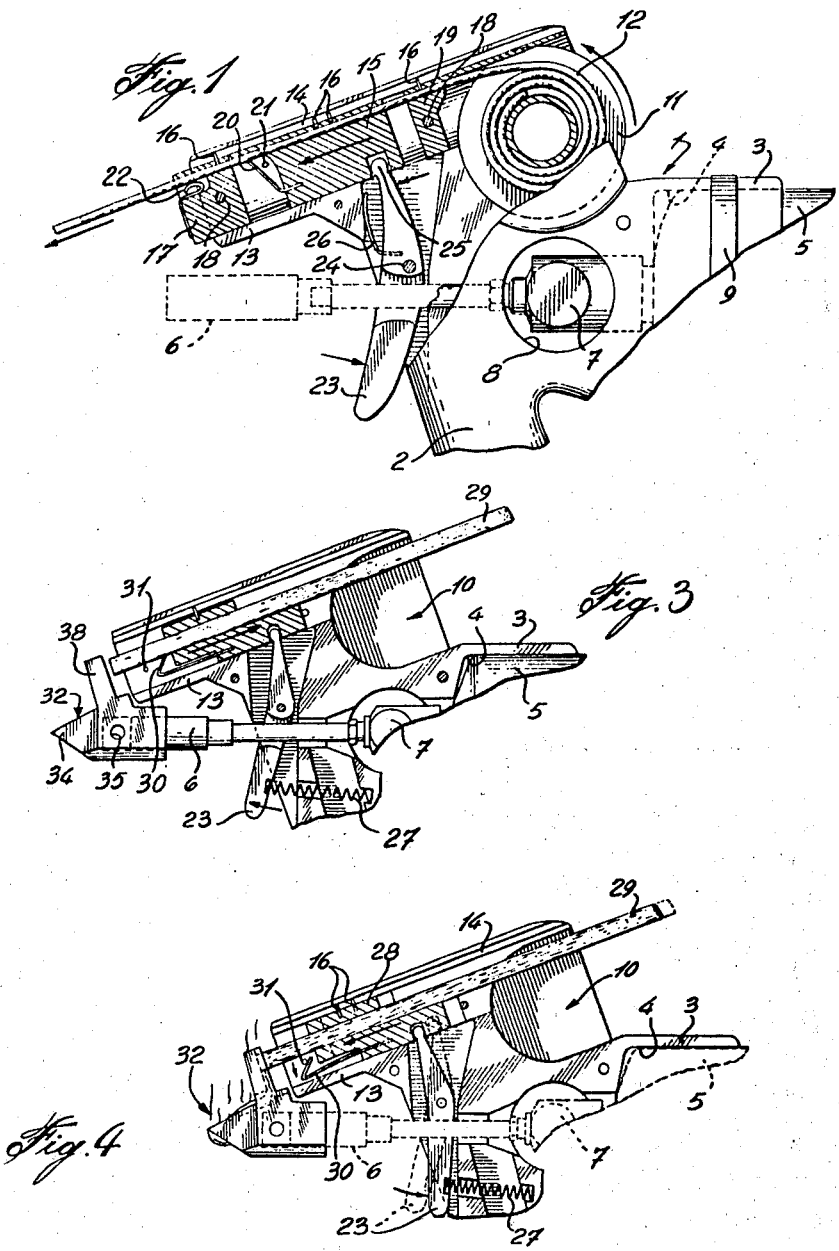

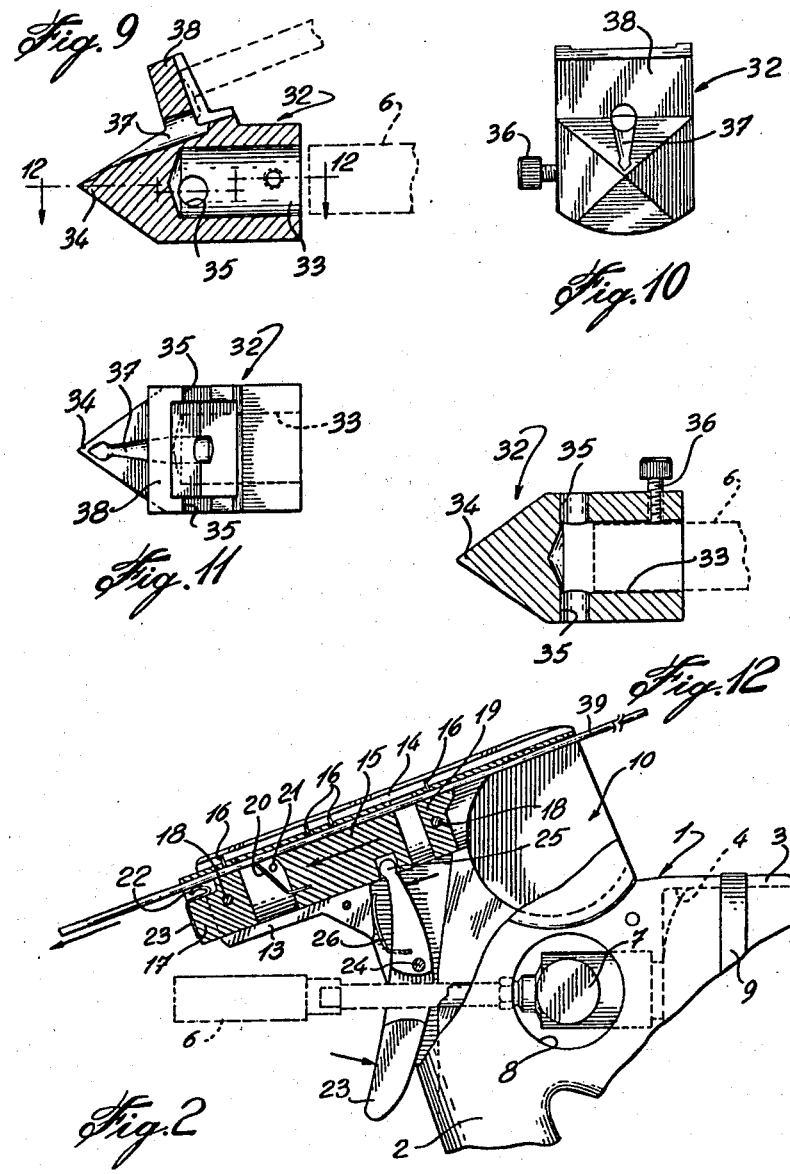

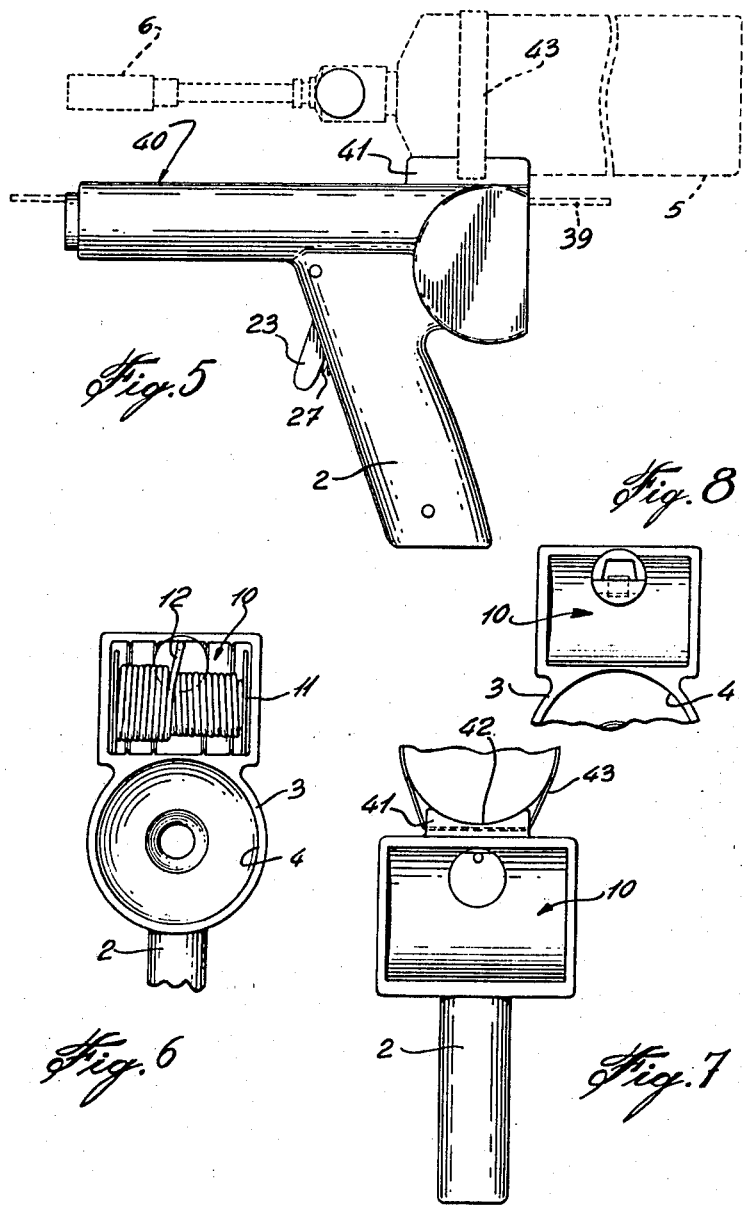

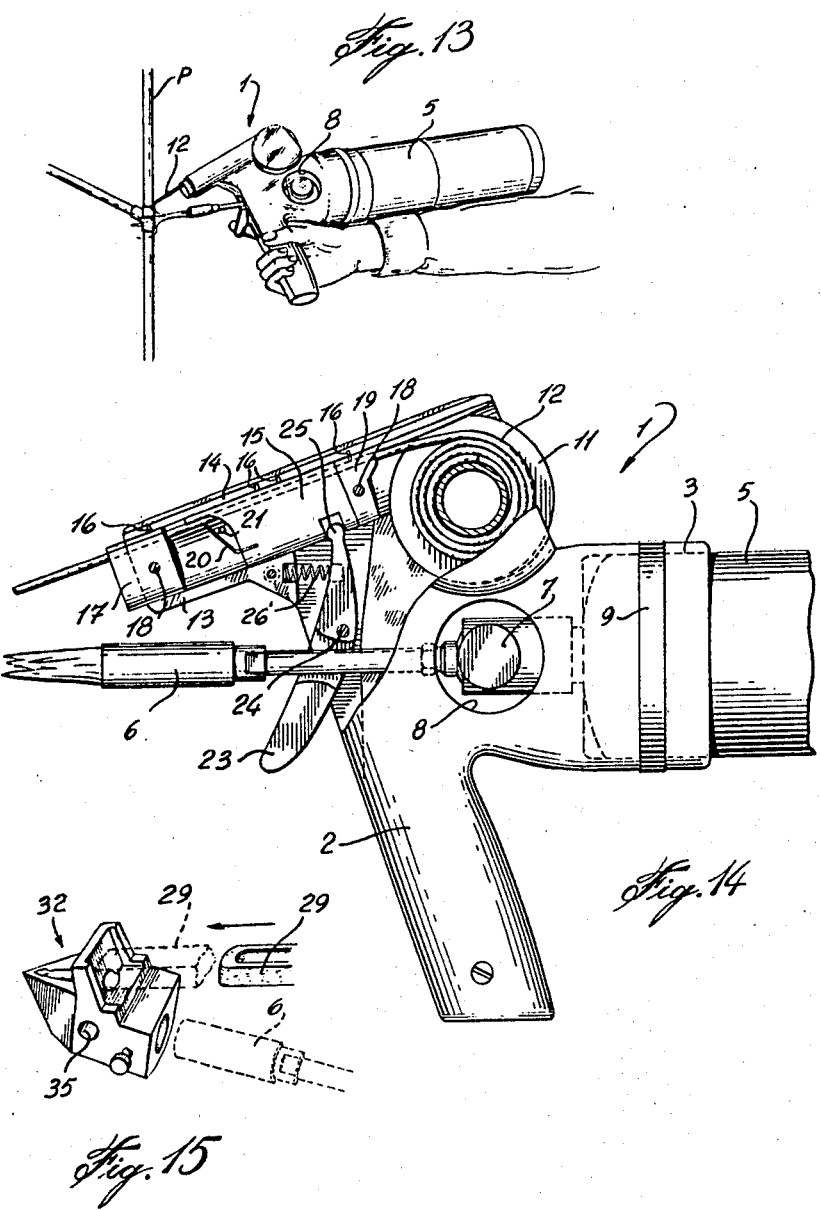

SOLDER FEEDING GUN AND ATTACHMENT

This invention relates to the feeding of solder to the nozzle of a soldering torch and more particularly to a device of the gun type to so feed a strip of solder and to an attachment to melt the solder.

A strip of solder is meant to include solder of any elongated form such as soldering wires, strips, rods, and bars.

The soldering torch of interest in this case is made of a tank or cylinder for a combustible gas and with a nozzle connected to the cylinder to burn the gas and produce heat to melt the solder. Such torch using propane is well known on the market.

There has been proposed to provide an electric welding gun with an attachment to feed a strip of solder to the heating tip. Such attachment is particularly adapted to be connected to an electric welding gun and is not suited for use with a soldering torch of the aforementioned type and in particular is not adapted to be held and operated by the same hand that holds the torch. This is so since neither provide a suitable handle or hand grip for simultaneous carrying of both.

It is a general object of the present invention to provide a solder feeding gun that is particularly adapted to carry a soldering torch of the above type and to feed a strip of solder to its nozzle.

It is a more specific object of the present invention to provide a solder feeding gun providing a hand grip and a support to simultaneously carry the soldering torch thereon with only one hand.

It is another object of the present invention to provide a solder feeding gun that is of simple construction and operation and that is readily adapted to feed either a soldering wire or a soldering bar.

It is a further object of the present invention to provide a solder feeding gun that is readily connected and disconnected from association with a soldering torch of the above type whereby each of the gun and torch may be used separately.

The above and other objects and advantages of the present invention will be better understood with reference to the following detailed description of preferred embodiments thereof which are illustrated, by way of example, in the accompanying drawings, in which:

FIGS. 1 and 2 (the latter found on the third sheet of drawings) are each a side elevation, partly in section, of a solder feeding gun according to a first embodiment of the present invention feeding a solder wire and a solder rod respectively;

FIGS. 3 and 4 are side elevation views of a solder feeding gun according to a second embodiment of the present invention in two different positions respectively to feed a solder bar;

FIG. 5 is a side elevation view of a solder feeding gun according to a third embodiment of the present invention;

FIG. 6 is a rear view of the solder feeding gun of FIGS. 1 and 2;

FIG. 7 is a rear view of the solder feeding gun of FIG. 5;

FIG. 8 is a rear view of the solder feeding gun of FIGS. 3 and 4;

FIG. 9 is a longitudinal section through a solder melting attachment used in the embodiment of FIGS. 3 and 4;

FIGS. 10 and 11 are a front and top view respectively of the same solder melting attachment;

FIG. 12 is a cross-sectional view as seen along line 12—12 of FIG. 9;

FIG. 13 is a perspective view showing how the gun is used;

FIG. 14 is a side elevation, partly cut away, of another embodiment; and

FIG. 15 is an exploded perspective view of the solder melting attachment and associated elements.

The solder feeding gun of the first embodiment illustrated in FIGS. 1, 2 and 6 comprises a body 1 including a downward projection 2 forming a hand grip of the pistol grip type. The body 1 has a portion 3 provided with a cylindrical recess 4 to form a holder for the cylinder, tank or bottle 5 of a soldering torch. The latter is thus held with its nozzle 6 extending forwardly through the body 1 and outwardly thereof.

Thus, the soldering torch longitudinally extends in a fore and aft direction. The soldering torch includes a valve control knob 7 that is accessible through a lateral aperture 8 in the body 1. Thus, the outward flow of combustible gas is controllable by rotation of the control knob 7. A tightening clamp 9 is engaged around the tubular portion defined by the holder portion 3 which is longitudinally slit, to firmly clamp and hold the cylinder 5 in the cylindrical recess 4.

The body 1 has an upper portion forming a cylindrical cavity at 10 whose axis extends transversely relative to the fore and aft direction. The cavity 10 is arranged to form a recess for a spool 11 of coiled solder wire 12.

The body 1 includes an upper and forward portion defining a piston chamber portion 13. The latter is bored from end to end in an axial direction extending fore and aft and converging with the nozzle 6 such that the forward end of the portion 13 is adjacent the nozzle 6. A guiding groove 14 is formed at the top of the piston chamber and along the latter. A piston 15 is engaged in the piston chamber and slidably guided in the latter by projections 16 thereon riding in the guiding groove 14. The piston 15 is formed with a passage for the solder extending longitudinally thereof and through its upper portion. A solder holding and outlet block 17 is fixed by a removable transverse pin 18 in the forward end of the piston chamber and it is also formed with a solder passage in alignment with the solder passage in the piston 15. The block 17 is also provided with a projection 16 engaging in the guiding groove 14. A solder straightening block 19 is fixed by another removable transverse pin 18 in the rear end of the piston chamber and it is also formed with a solder passage maintained in alignment with the solder passage of the piston by a projection 16 engaging guide groove 14. A resilient blade 20 is fixed on the front of the piston 15 and its sharp upper end is biased to engage the solder strip 12 and push it forward upon forward displacement of the piston. Thus, the resilient blade 20 is adapted to form a pusher for the strip of solder but merely slides against the solder upon backward displacement of the piston. Transverse registering holes 21 open in the piston chamber rearward of the resilient blade 20 to receive a removable pin which disengages the latter upon rearward movement of piston 15 and completely frees the strip of solder to remove the latter from the gun. The solder outlet block 17 supports a spring 22 with a curved end which is constantly biased against the solder wire to hold the latter against backward displacement.

A finger-actuated lever 23 is arranged like a trigger to actuate the piston 15. For that purpose, the lever 23 is pivoted at 24, has an upper end 25 removably fitting into a notch in the piston and is spring biased backward by a spring blade 26.

The solder feeding gun illustrated in FIGS. 3, 4 and 8 is similar to the embodiment described with reference to FIGS. 1, 2 and 6 except for the finger actuated lever 23 that is biased by a helical spring 27 rather than by the spring blade 26 except for the piston and components in the piston chamber that are different. For the sake of clarity, the same elements in both embodiments are identified by the same reference numerals and reference should be made to the preceding description for their detailed description.

FIG. 14 shows an embodiment similar to FIG. 1 except that spring blade 26 is replaced by a compression coil spring 26'.

In this second embodiment illustrated in FIGS. 3, 4 and 8, the piston 15 and blocks 17 and 19 are replaced only by a piston 28. The latter is particularly adapted to feed a solder bar 29 while the piston 15 and blocks 17 and 19 are particularly adapted to feed a solder wire 12. It must be appreciated that the piston 15 and associated blocks 17 and 19 are merely inter-changeable with the piston 28 to use the same solder feeding gun with a solder wire or a solder bar inter-changeably.

The piston 28 is also provided with guiding projections 16 riding in the guiding groove 14. The solder passage in this piston is large enough to slide a solder bar 29 endwise therethrough. A resilient blade 30 is provided to hold the solder bar in fixed position relative to the piston until the latter is moved forward by the finger 23 to force the resilient blade away from the solder bar upon engagement with a removable transverse abutment pin 31, as shown in FIG. 4. Thus, the solder bar is caused to move forward under gravity to engage a solder melting implement 32 adapted to be used with or without the solder feeding gun of FIGS. 3, 4 and 8. Release of finger 23 causes retraction of bar 29 by blade 30.

The solder meltimg implement illustrated in FIGS. 3, 4 and 9 to 12 inclusive is adapted to engage on the nozzle 6 of a soldering torch of the aforementioned type. This solder melting implement 32 comprises a body formed with a cylindrical cavity 33 aligned with a pointed tip portion 34. A pair of aligned flame outlet bores 35 diametrically extend through the solder melting implement to outwardly vent the cylindrical cavity 33. A set screw 36 diametrically extends into the cavity to fixedly secure the solder melting implement 32 on the nozzle 6 of a soldering torch. A solder trough 37 is formed on top of the implement and extends longitudinally down to the tip 34. A solder bar abutment 38 extends transversely over the trough 37 such that, as shown in FIG. 4, when the solder bar 29 abuts against the abutment 38, it is heated to melt and flow down the trough 37 to the tip 34 where it drips for soldering.

The solder feeding gun, illustrated in FIGS. 1, 2 and 6 and as shown in FIG. 2, is also adapted to feed a solder rod 39 instead of a solder wire 12.

The solder feeding gun illustrated in FIGS. 5 and 7 is also adapted to feed a solder wire 12 or a solder rod 39 as in the embodiment of FIGS. 1, 2 and 6. The embodiment of FIGS. 5 and 7 features a body 40 having a slightly different configuration but still comprising the supporting hand grip 2, the holder portion forming a cylindrical cavity 10 for a spool of solder wire, and a piston chamber portion housing the same piston 15 and blocks 17 and 19 as in the first embodiment. The finger-actuated lever 23 is biased by a spring 27 as in the embodiment of FIGS. 3, 4 and 8. The body 40 also features a mounting pad or portion 41 defining a cylindrical recess 42 onto which the cylindrical tank or bottle 5 of a soldering torch is strapped down by a strap or band 43.

It must be appreciated that the solder feeding gun of the present invention is primarily adapted to carry a soldering torch to be used with the latter and to hold both with only one hand as shown in FIG. 13 for instance to solder joints in piping P. However, the gun and the torch can both be used separately one from the other.

What I claim is:

1. A solder feeding gun to be used in combination with a soldering torch, of the type including a combustible gas-containing cylindrical tank and a nozzle protruding from one end of said tank, said gun comprising an elongated body having a front end and a rear end, clamp means to secure said tank to the rear end of said body with said nozzle exposed at the forward end of said body, a pistol type handgrip depending from said body to hold the same and said tank in operative position, said body having a cavity at its rear end for holding a spool of coiled solder wire, said body forming a longitudinally-extending straight piston chamber opened at the front of said body and in full communication with said cavity, an outlet block removably held within the front portion of said piston chamber, a solder-straightening block removably held within the rear portion of said piston chamber adjacent said cavity, a piston slidable within said piston chamber intermediate said two blocks and removable from said piston chamber, said two blocks and said piston each having a longitudinal passage for slidably receiving and guiding said solder wire, means to maintain said blocks and said piston with their respective passages in mutual register, a finger-actuated lever pivotally carried by said body and removably connected to the piston to displace the latter towards said outlet block, spring means connected to said lever and biasing the same to displace said piston towards said solder-straightening block, a resilient pusher blade fixed to said piston and biased against said solder wire to grip and move said wire through said block passages during movement of said piston towards said outlet block and to release the grip on said wire during movement of said piston towards said straightening block, and a resilient means carried by one of said blocks and resting on said wire to bias the same against displacement during movement of said piston towards said solder wire-straightening block, said piston operatively displacing said solder wire outwardly of the front end of said body, thereby feeding said wire to be melted by heat produced by the nozzle of the soldering torch.

2. A solder feeding gun as defined in claim 1, wherein said body forms at its rear end portion a cylindrical recess to receive the end portion of said tank provided with said nozzle, the longitudinal axis of said cylindrical recess converging with the longitudinal axis of said piston chamber in the direction of the front end of said body.

3. A solder feeding gun as claimed in claim 2, further including a solder-melting attachment removably secured to said nozzle, said attachment having a body forming a cylindrical cavity receiving said nozzle, a solder trough extending on said attachment body longitudinally of the cylindrical cavity, at last one flame outlet exteriorly venting the cylindrical cavity, a solder abutment fixedly secured over said solder trough and in registry with the front open end of said piston chamber to hold a solder bar extending within said piston chamber in register with said trough, said abutment being integrally formed with said attachment body and including a transverse portion bridging over said solder trough, said outlet block, piston and solder-straightening block being removed from said piston chamber and said piston replaced by a second piston having a longitudinal passage accommodating said solder bar, said second piston being fitted with a resilient blade holding said solder bar against movement relative to said piston, and a removable pin extending across said piston chamber and engaging said resilient blade to release the same from said solder bar in the front limit position of said second piston.

* * * * *